United States Patent [19]

Omori et al.

[11] 4,086,463
[45] Apr. 25, 1978

[54] FLUX-CORED WIRE

[75] Inventors: Jimpei Omori, Nishinomiya; Mitsuo Kono, Kodaira; Torataro Takeuchi, Chigasaki; Noboru Oikawa, Yokohama, all of Japan

[73] Assignee: Tsukishima Kikai Co., Ltd., Tokyo, Japan

[21] Appl. No.: 652,158

[22] Filed: Jan. 26, 1976

Related U.S. Application Data

[63] Continuation-in-part of Ser. No. 413,633, Nov. 7, 1973, abandoned.

[30] Foreign Application Priority Data

Nov. 13, 1972  Japan .................................. 47.113604

[51] Int. Cl.$^2$ ............................................. B23K 35/30
[52] U.S. Cl. ................................. 219/145.22; 148/24; 219/73.1; 219/146.23
[58] Field of Search ................. 148/24, 26; 219/73 R, 219/145, 146

[56] References Cited

U.S. PATENT DOCUMENTS

| | | | |
|---|---|---|---|
| 3,118,053 | 1/1964 | Arikawa et al. | 219/146 |
| 3,193,661 | 7/1965 | Danhier | 219/146 |
| 3,495,069 | 2/1970 | Cavanagh et al. | 219/146 |
| 3,805,016 | 4/1974 | Soejima et al. | 219/146 |
| 3,868,491 | 2/1975 | Ito et al. | 219/146 |

Primary Examiner—J. V. Truhe
Assistant Examiner—N. D. Herkamp
Attorney, Agent, or Firm—Edwin E. Greigg

[57] ABSTRACT

A flux-cored wire for electrogas arc welding includes a sheath of steel hoop made of material selected from a group of materials consisting of mild steel and stainless steel. A flux is provided internally within the coating. The flux contains $CaF_2$, Fe—Si, $SiO_2$, $CaCO_3$, Cr and Mn. The flux may also contain Fe, Fe—Nb, Me—Mo and/or Me—Cu.

5 Claims, 9 Drawing Figures

SHIELDED ARC WELDING

ELECTROGAS ARC WELDING

ELECTROGAS ARC WELDING

FLUX-CORED WIRE

CROSS-REFERENCE TO RELATED APPLICATION

This application is a continuation-in-part application of Ser. No. 413,633, filed Nov. 7, 1973 by Jimpei Omori, Mitsuo Kono, Torataro Tokeuchi and Noboru Oikawa, entitled FLUX-CORED WIRE, and now abandoned.

BACKGROUND OF THE INVENTION

This invention relates to a flux-cored wire for electrogas arc welding. The invention relates, more particularly, to a flux-cored wire useful for electrogas arc welding such as automatic gas shielded vertical arc welding of austenitic stainless steel.

Heretofore, an arc welding technique using a sheathed metal electrode has been principally used in processes for the arc welding of stainless steel.

Gas shielded arc welding processes, such as argon shielded or $CO_2$ gas shielded arc welding and non-shielded arc welding process, have recently been utilized broadly. A submerged arc welding process has been used for the welding of plates having more than 20 mm of thickness, but this known process requires large quantities of compositions and additional facilities. Moreover, since the process uses multi-layer welding, its working efficiency is low. Furtherore, the welded material has poor corrosion resistance in the welded portion, if the material is to be used as a corrosion-resistant material.

There are electroslag welding processes which involve a consumable nozzle electroslag welding using a solid wire, flux-cored wire and hoop wire, etc., and an electrogas arc welding process which uses principally flux-cored wire, etc., for automatic vertical welding. The electroslag welding process is mainly used for the welding of a steel plate, but if the width of penetration is broad, the welded portion is easily cracked and its notch toughness is low, these being distinct disadvantages. The electrogas welding process, as heretofore used broadly for the welding of reservoir tanks and the sideplates of vessels, uses large quantities of mild steel or high tensile steel, but there exists no wire for the exclusive use of the electrogas arc welding presently on the market, so far as applicants know, for stainless steel. In other words, major wires used for stainless steel which have presently come into the market are flux-cored wires and solid wires for the MIG welding process, solid wires for the submerged arc welding process, and flux-cored wires for the no-gas arc welding process. Consequently, it is impossible to apply these wires to the electrogas arc welding, due to its poor workability and performance including poor corrosion resistance. Accordingly, this process has not yet received any significant notice so far.

The basic difference between wire for electrogas arc welding and that for MIG welding resides in the content of flux in the wire. That is, the wire for MIG welding contains greater amount of flux than that for electrogas arc welding. In the case of MIG welding, slag is always accumulated above the bead to serve as a protection, as shown in FIG. 1. Since welding is always performed in the lateral direction on the new base metal, even if slag is formed in great quantity, the arc seldom sparks over the slag. Therefore, the wire for MIG welding can maintain a constant arc stability, weldability and workability (generation of spatter, fume, etc.) in MIG welding.

However, in the case of electrogas arc welding, as illustrated in FIGS. 2 and 3, the welding position is vertical and the metal is vertically deposited successively. Further, there is a certain limitation to the amount of slag which escapes in the direction of the copper shoes on both sides to protect the bead, as shown in FIG. 3. Therefore, if the wire for MIG welding is used for electrogas arc welding, extra slag which could not escape toward the copper shoes, cause the result that slag is excessively accumulated above the deposited metal, indicated by dotted lines. Under such situation, the electric arc comes to spark over the slag, resulting in impaired electro-conductivity and arc stability, and it may finally become impossible to generate the electric arc any more. Actually, when the arc sparks over the slag, workability is extremely worsened due to scattering of slag and spatter. If the arc is further given thereover, the wire fed is heated red hot and bent, and the wire feed is finally stopped by a short circuit.

If welding is further continued in spite of increased amount of slag, heat is taken away by such slag to cause imperfect penetration, slag inclusion and formation of many blowholes, resulting in a spoiled weld.

Flux-cored wire for no-gas arc welding contains even greater amount of flux than the wire for MIG welding, and it has already been experimentally ensured that such wire is quite useless for electrogas arc welding.

Use of solid wire for electrogas arc welding results in very poor weldability, and no desired effect can be obtained. As it is impossible to add arc stabilizer, slag forming agent and such to solid wire, welding by use of such solid wire invites enlarged particle size and increased amount of spatter, resulting in low deposition efficiency and poor economy. Also, as the bead is not protected with slag forming agent, there takes place vehement high-temperature oxidation, and Cr, Mn, Si and the like effuse in the form of oxides, so that the required deposited metal content is not obtained. Further, when the weld length increases, a large amount of spatter deposits on the nozzle, gas outlets of copper shoes, etc., to cause impediment to the welding operation. For these reasons, solid wire can not be immediately used for electrogas arc welding.

As already known, there are three structures, austenite, ferrite and martensite, representatively, of stainless steel. As to the weldability of these structures of the stainless steel, the ferrite form has a heat sensitivity so as to cause embrittleness with the result that weld cracks may easily occur, and the martensite form has still poorer weldability so as to cause weld cracks because of its hardenability. As a consequence, martensite requires an annealing after preheating and immediately after welding. The austenite form, on the other hand, has no disadvantages of hardenability and has low cracking sensitivity and is the most weldable of the three types, special types being excluded.

SUMMARY OF THE INVENTION

It is an object of the present invention to provide a flux-cored wire useful for electrogas arc welding which eliminates the aforementioned disadvantages and drawbacks.

The flux-cored wire of the present invention is provided with an alloying agent, deoxidizing agent, slag forming agent, etc., for the automatic gas shielded vertical arc welding of austenitic stainless steel having a metallurgically preferable jointing performance. The process can be denominated an electrogas arc welding process.

The foregoing object, as well as others which are to become apparent from the text which follows, is accomplished in accordance with the present invention by providing a flux-cored wire for electrogas arc welding of austenitic stainless steel which wire includes a sheath of steel hoop made from material selected from a group of materials consisting of mild steel and stainless steel. A flux is provided internally within the sheath. The flux contains from substantially 5% to substantially 20% $CaF_2$, from substantially 1% to substantially 20% Fe-Si, from substantially 1% to substantially 5% $SiO_2$, from substantially 1% to substantially 6% $CaCO_3$, from substantially 10% to substantially 70% Cr, from substantially 5% to substantially 40% Ni, from substantially 0% to substantially 70% Fe and from substantially 1% to substantially 20% Mn, by weight.

More specific embodiments of the flux-cored wire may also include from substantially 1% to substantially 25% Fe-Nb, or from substantially 3% to substantially 30% Me—Mo, or from substantially 5% to substantially 30% Me—Cu, by weight.

The flux-cored wire of the present invention is for the welding of austenitic stainless steel which is easily weldable as aforementioned using the flux-cored wire according to the present invention. When used for electrogas welding sufficient consideration should be given to the characteristics of a power supply, the composition of shielded gas, the welding jig and tools, the transferring shape of the arc, etc., and to the workability, productivity, economy, corrosion resistance, and joint performance of the product. That is, the flux-cored wire of this invention is used for welding with high efficiency of plates, for example, plates having a thickness of from about 10 to about 60 mm. The combination of shape of grooves and number of layers may be great, yet the stainless steel can be readily welded without porosity and without deteriorating the property of the base metal so as to obtain a good appearing bead, good quality and a sound welded portion. In addition, the wire of the present invention does not require an additional coating and, particularly, a stainless steel hoop of limited chemical composition, but any mild steel hoop, stainless steel hoop and the like iron steel hoop or stainless steel hoop adapted for the base metal may be used. The flux, as stated above, is composed of from 5% to 20% $CaF_2$, from 1% to 20% Fe—Si, from 1% to 5% $SiO_2$, from 1% to 6% $CaCO_3$, from 10% to 70% Cr, from 5% to 40% Ni, from 0% to 70% Fe, from 1% to 20% Mn, by weight. The particular percentages used in any given case should be chosen with regard to components of the base metal sought to be welded and the coating provided by the hoop. Ti, CaSi, rare earth metals, etc., are added upon necessity or if desired for refining operations, such as deoxidation, denitrification, etc., and argon and $CO_2$ mixture gas is mainly contained in the shileded gas.

BRIEF DESCRIPTION OF THE DRAWINGS

The above mentioned object, features and advantages of the present invention will become more fully apparent from the following description, taken in conjunction with the accompanying drawings.

FIG. 1 illustrates the formation of a weld by the MIG shielded arc welding process.

FIG. 2 is a perspective, partly sectional, view of a typical electrogas arc welding fixture.

FIG. 3 illustrates the formation of a weld by the electrogas arc welding process.

DETAILED DESCRIPTION OF THE PREFERRED EMBODIMENTS

Figure 1:
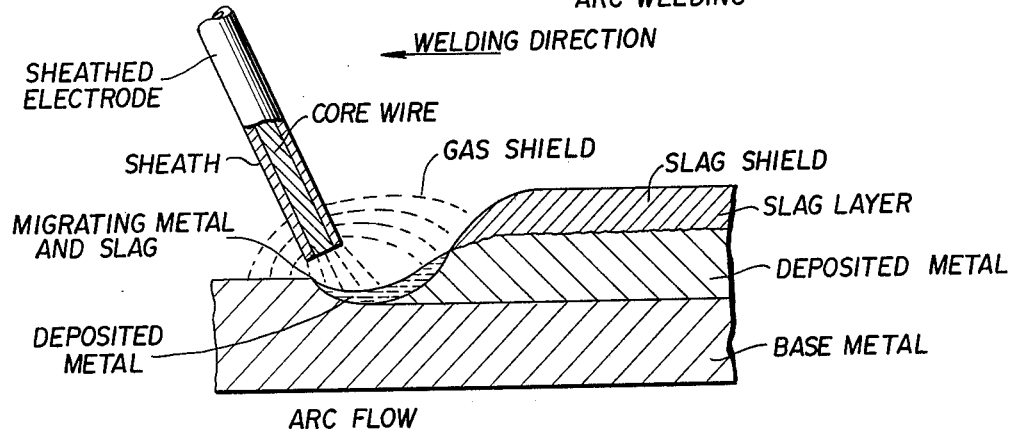
FIGS. 1–3, illustrating different welding processes, are included as background, for this invention.
Figure 2:
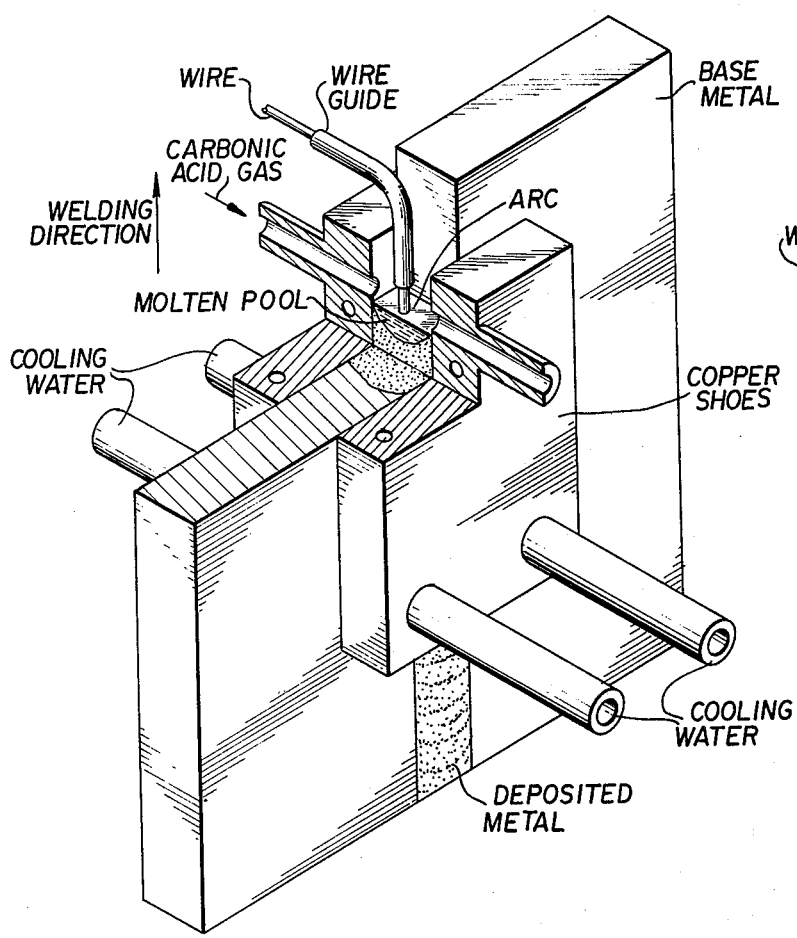
Figure 3:
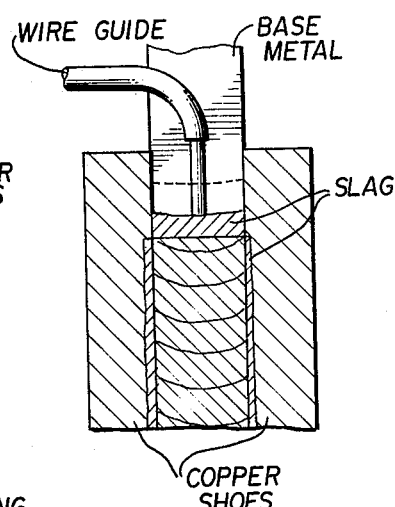
Figure 4:
FIGS. 4–7 are sectional views of respective embodiments of flux-cored wires in accordance with the present invention.
Figure 5:
Figure 6:
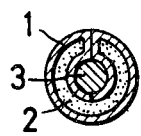
Figure 7:

FIGS. 4 to 7 shows the section of respective flux-cored wires according to the present invention. In each of FIGS. 4 to 7 the wire includes a sheath 1 and a flux 2. As shown in FIG. 6, the wire includes a centrally positioned electrode 3 made of a mild steel or stainless steel. These flux-cored wires are all partially bent so that parts of the sheath hoop extend into the internal portion of the wire where the flux 2 is held. Since thus constructed, the flux 2 is sufficiently and closely filled into the internal portion of the sheath hoop material so that the metal and flux are uniformly molten during welding and an electric current flows uniformly. The flux-cored wire allows one to obtain a uniform and sound weld portion with high working efficiency.

The operation and advantages and effects of the respective materials used as components of the flux of the flux-cored wire of the present invention will now be described in the following:

The $CaF_2$ component is evaporated during welding so as to shield the molten metal from the atmosphere in order to prevent $N_2$ and $O_2$ in the atmosphere from mixing and to improve the fluidity of the slag and further to stabilize the arc. If this component is less than substantially 5%, the shielding effect becomes incomplete and the fluidity of the slag decreases so that the electrogas arc welding becomes impossible. If this component is more than substantially 20%, the arc becomes unstable and the appearance of the bead is deteriorated. Accordingly, $CaF_2$ is preferably present in the flux from substantially 5% to substantially 20%, by weight.

The $CaCO_3$ component as carbonate adjusts the melting point and viscosity of slag and stabilizes the arc so as to form shielding of slag. If this component is less than substantially 1%, the slag excessively adheres to the bead so that it becomes difficult to separate it. If this component is more than 6%, differently from the other welding process, its viscosity is increased so as to form poor shielding of slag. Accordingly, in the electrogas arc welding process the $CaCO_3$ is preferably present in the flux from substantially 1% to substantially 6% in relation to the $CaF_2$, by weight.

The iron powder component improves the stability and resistance of arc and increases its deposition rate and simultaneously enhances its deposition efficiency. Accordingly, iron powder is used in the range of from substantially 0% to substantially 70% in order to increase the efficiency of welding. The iron powder improves the fluidity of the finely pulverized flux, and accordingly enhances the efficiency for manufacturing the wire of the present invention.

From substantially 1% to substantially 20% Mn is added as a deoxidizing agent and alloying agent in order to adjust the chemical components in the depositing metal. This component is useful as an austenite formation element.

From substantially 1% to substantially 20% Fe—Si is added as a deoxidizing agent and alloying agent in order to adjust the chemical components in the depositing metal. This component is also useful as an austenite formation element.

The $SiO_2$ component is added as one of slag forming agents in order to prevent the depositing metal from oxidization and nitrification by covering the depositing metal therewith and promote favorably the metallurgic chemical reaction of the deoxidization or so. If this component is more than substantially 5%, the good welding performance is obstructed and the fluidity of the slag becomes bad, differently from the other welding process. Accordingly, in the electrogas arc welding process, $SiO_2$ is preferably present in the flux from substantially 1% to substantially 5%, by weight.

Cr, Ni, Ti, Mo, Nb, Cu, Ta, etc., are added for improving the dense structure of deposited steel, strength, corrosion resistance, crack resistance, fluidity of flux, etc., and are properly added to adjust the necessary content with respect to the particular amount of sheathing material used in any given case.

Particularly, the Cr and Ni components are very significant elements in the austenitic stainless steel, and the former is useful as a ferrite formation element and the latter is useful as an austenite formation element. These components are apt to fluctuate under the influence of the components content of the sheath, flux ratio with respect to the sheath, yield of the element, shielding gas component and so on. Since the amount of Cr and Ni to be added to the flux is considerably high in general even taking the chemical component of the sheath, the flux needs to use pure metallic Cr and Ni. And if the flux ratio is increased, the amount of the Cr and Ni to be added to the flux can be reduced as a whole, but when the flux ratio is excessively increased over the predetermined ratio, the welding become impossible. Accordingly, the Cr is preferably present in the flux from substantially 10% to substantially 70%, by weight. But the Ni is somewhat less than the lower and upper ratio of the Cr.

Me—Mo represents a pure metallic powder of Mo, which is more than 99% in purity. This component is useful as a ferrite formation element, and if from substantially 3% to substantially 30%, by weight, Me—Mo is added to the flux thus formed, it is particularly adapted for the formation of welds having high strength at high temperature and better corrosion resistance.

Me—Cu represents a pure metallic powder of Cu, which is more than 99% in purity. This component is useful as an austenite formation element, and if from substantially 5% to substantially 30%, by weight, Me—Cu is added, it is adapted particularly for producing welds which have good corrosion resistance against non-acidic acid such as sulfuric acid.

Fe—Nb represents a ferroally of Nb which contains more than 60% of Nb plus Ta. This component is useful as a ferrite formation element, and if from substantially 1% to substantially 25%, by weight, Fe—Nb is added to the flux thus formed, it is particularly adapted for preventing the grain boundary of welds from corroding.

Listed below are several types of steel which contain Mo, Cu and/or Nb:

| Type | | |
|---|---|---|
| 316 | 18Cr - 12Ni - 2.5Mo | (common appellation) |
| 316 JI | 18Cr - 12Ni - 2Mo - 2Cu | (common appellation) |
| 317 | 18Cr - 12Ni - 3.5Mo | (common appellation) |
| 347 | 18Cr - 8Ni - Nb(Ta) | (common appellation) |

The deposited metal formed by welding the steel types of 316, 316JI and 317 includes Mo within a range of 2 – 3%, 1.20 – 2.75% and 3 – 4% of substance respectively, while the deposited metal formed by welding the steel type of 316JI includes Cu within a range of 1 – 2.5%. Also, the deposited metal formed by welding the steel type of 347 includes Nb + Ta in approximately 0.8% of substance. Thus, Mo, Cu and Nb are not required so much amount as additive element.

Therefore, Mo, Cu and Nb are respectively added to the flux in response to the welding conditions, shield composition, power charcteristics, arc behavior, spatter loss, etc. In this case, the amount of Mo is limited from 3% to 30%, the amount of Cu is limited from 5% to 30%, and the amount of Nb is limited from 1% to 25%. If these components of Mo, Cu and Nb are more than 30% and 25% respectively, the stainless characteristics of the austenite type is lost and the product becomes unable to stand use as corrosion-resisting material.

In the present invention, from substantially 5% to substantially 50% of flux by weight is contained within the sheath. If the flux within the sheath is less than 5%, the arc becomes unstable and the shielding of slag also becomes poor, and if the flux within the sheath is more than 50%, the slag becomes excessive so that it may overflow or the alloy components become excessively filled in the depositing metal so as to cause deterioration of its mechanical properties. However, due to particular posture of the electrogas arc welding which is automatically welded by piling up the depositing metal vertically, the most desirable condition of the welds can be obtained when from substantially 7% to substantially 20% of flux, by weight, is contained within the sheath, whereas the other type of flux-cored wires useful for MIG welding process contain from 35% to 40% of flux, by weight, within the sheath. The above mentioned extended range of the flux ratio is recited for the case that only the high efficiency is required even ignoring the workability.

The tested results of electrogas welding using the flux-cored wire of the present invention will now be described in the following:

Table 1 shows a chemical component of a stainless steel hoop having a thickness of 0.25 mm and a width of 20 mm as the sheath of the wire used in the example, and Table 2 shows the mixture ratio of flux contained in the sheath.

In the Table 2, the Fe—Si component contains 40% Si, and the Cr is more than 99% in purity, and the Ni and the Mn are more than 99.9% in purity.

Table 1:

| Example | Chemical Composition of Sheath Steel Hoop | | | | | | |
|---|---|---|---|---|---|---|---|
| | Chemical composition % | | | | | | |
| | C | Si | Mn | P | S | Cr | Ni |
| Sheath | 0.06 | 0.76 | 1.25 | 0.02 | 0.01 | 15.53 | 13.96 |

Table 2: Mixture of Ratio of Flux

| Composition % | | | | | | |
|---|---|---|---|---|---|---|
| CaF₂ | CaCO₃ | SiO₂ | Fe-Si | Cr | Ni | Mn |
| 12 | 4 | 2 | 2 | 55 | 10 | 15 |

Table 6: Chemical Composition of All Weld Metal

| Chemical composition % | | | | | | |
|---|---|---|---|---|---|---|
| C | Si | Mn | P | S | Cr | Ni |
| 0.06 | 0.06 | 1.50 | 0.007 | 0.011 | 18.9 | 10.6 |

Table 7: Mechanical Properties of Submerged Arc Welding Portion

| Yield Point (kg/mm²) | Tensile strength (kg/mm²) | Elongation % | Reduction of area % | Absorption energy (kg-m) −20° C | Absorption energy (kg-m) −196° C. |
|---|---|---|---|---|---|
| 28.8− 30.5 | 53.3− 59.6 | 51.0− 55.0 | 60.0− 62.0 | 5.25 | 2.75− 4.14 |

Figure 8A:
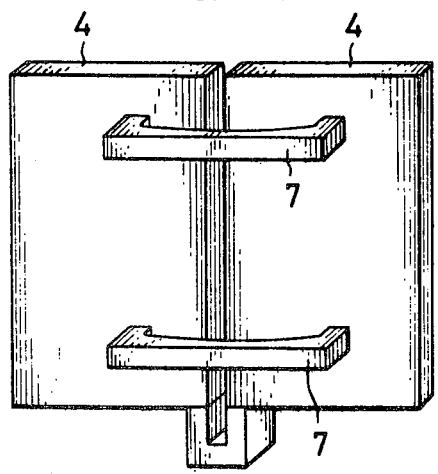
FIGS. 8a and 8b are perspective and plane views of the base metal used in the welding test showing the shape thereof.
Figure 8B:
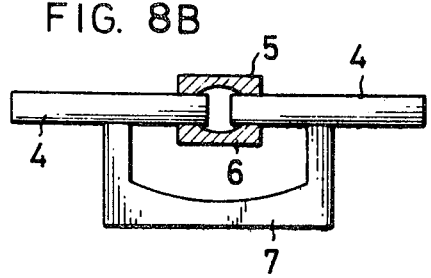

The wire used in the tests described below was made by containing from substantially 10% to substantially 20% of the flux, by weight, as stated in Table 2 within the sheath of stainless steel hoop formed of the materials surrounding forth in Table 1. The wire was constructed so as to have the particular cross section shown in FIG. 4. The base metal was SUS304 having a thickness of 25 mm and being shaped as shown in FIGS. 8a and 8b. The base metal was in the form of two rectangular plates 4 held in the vicinity of one another by U-shaped members 7. One layer of I-shape in section was welded. The welding equipment used was of the conventional electrogas welding type, and the welding was accomplished by surrounding a molten pool with a water-cooled cooper shoe, shown diagrammatically as elements 5, 6 in FIG. 8b, with an Ar + CO₂ gas shielding. The welding conditions of this case are shown in Table 3, the tensile test results of the all weld metal as welded are shown in Table 4, the impact test results of the all weld metal as welded are shown in Table 5, and the chemical composition of the all weld metal is shown in Table 6. The unit of absorption energy in Table 5 is by kg-m, and a test piece of JIS No. 4 is used. There is no example as to the electrogas welding of stainless steel heretofore, and therefore one example of mechanical properties of the welded portion by submerged welding is shown in Table 7 for comparison.

Table 3:

| Items | Welding Conditions |
|---|---|
| | Welding conditions |
| Welding current | 440 – 460 amperes |
| Welding voltage | 33 – 34 volts |
| Welding speed | 46.7mm/min. |
| Shielding Ar | 70 – 90% |
| Gas CO₂ | 30 – 10% |
| Welding heat input | 193,000 C/cm |

Table 4: Tensile Test of All Weld Metal (as welded)

| Tensile strength kg/mm² | 58.3 | 57.7 |
|---|---|---|
| Elongation % | 53.3 | 54.1 |
| Reduction of area % | 65.7 | 70.4 |

Table 5: Impact Test of All Weld Metal (as welded)

| Test temp. | 1 | 2 | 3 | Mean |
|---|---|---|---|---|
| −196° C | 8.7 | 8.4 | 8.1 | 8.4 |
| −76° C | 14.6 | 14.3 | 14.6 | 14.5 |

Table 7 shows the state of the tested base metal and wire tested as welded using SUS304 type having a thickness of 22.2 mm.

As clear from the comparison of Table 4 with Table 7, there is almost no difference of tensile strength, elongation and reduction of area between the welded piece using the electrogas welding with the flux-cored wire of this invention and the welded piece by the submerged arc welding although the welding heat input is great, but, as seen in Table 5, the absorption energy of the present invention is much larger than that of the conventional one, and particularly the absorption energy at extremely low temperature of the present invention is remarkably larger than that of the conventional one.

It should be understood from the foregoing description that the electrogas arc welding of the austenitic stainless steel is possible with the flux-cored wire of this invention so as to obtain a high quality, non-porous, sound welding portion without deteriorating the performance of the base metal, and its workability, productivity, economy, corrosion resistant jointing performance are sufficiently satisfied so as to enhance its industrial value.

Although a number of embodiments of a flux-cored wire are described and illustrated, it is to be understood that they have been given by way of example, and are not to be considered to limit the spirit and scope of the invention, the scope being defined in the appended claims.

What is claimed is:

1. A flux-cored wire for automatic electrogas vertical arc welding of austenitic stainless steel comprising:
    a sheath of steel hoop made of material selected from a group of materials consisting of mild steel and stainless steel; and
    a flux provided internally within said sheath said flux containing from substantially 5% to substantially 20% CaF₂, from substantially 1% to substantially 20% Fe—Si, from substantially 1% to substantially 5% SiO₂, from substantially 1% to substantially 6% CaCO₃, from substantially 10% to substantially 70% Cr, from substantially 5% to substantially 40% Ni, from substantially 0% to substantially 70% Fe and from substantially 1% to substantially 20% Mn by weight.

2. A flux-cored wire according to claim 1, wherein said flux additionally includes from substantially 1% to substantially 25% Fe—Nb by weight.

3. A flux-cored wire according to claim 1, wherein said flux additionally includes from substantially 3% to substantially 30% Me—Mo by weight.

4. A flux-cored wire according to claim 1, wherein said flux additionally includes from substantially 5% to substantially 30% Me—Cu by weight.

5. A flux-cored wire for automatic electrogas vertical arc welding of austenitic stainless steel, using an argon and $CO_2$ mixture gas as the shielding gas, comprising:
 a sheath of steel hoop made of material selected from a group of materials consisting of mild steel and stainless steel; and
 a flux provided internally within said sheath, said flux containing from substantially 5% to substantially 20% $CaF_2$, from substantially 1% to substantially 20% Fe—Si, from substantially 1% to substantially 5% $SiO_2$, from substantially 1% to substantially 6% $CaCO_3$, from substantially 10% to substantially 70% Cr, from substantially 5% to substantially 40% Ni, from substantially 0% to substantially 70% Fe and from substantially 1% to substantially 20% Mn by weight.

* * * * *